United States Patent [15] 3,687,992
Feiler et al. [45] Aug. 29, 1972

[54] SOLID NITRILOTRIACETATE-METAL COMPLEXES

[72] Inventors: William A. Feiler, Kirkwood, Mo. 63122; Chung Yu Shen, St. Louis, Mo. 63166

[73] Assignee: Monsanto Company, St. Louis, Mo.

[22] Filed: Sept. 29, 1969

[21] Appl. No.: 862,070

[52] U.S. Cl..................260/429 R, 8/111, 71/27, 71/97, 260/429 J, 260/438.1
[51] Int. Cl..................C07j 13/00, C07j 1/08
[58] Field of Search..................260/429, 435.1

[56] References Cited

UNITED STATES PATENTS 2,859,104  11/1968  Kroll..................71/1
3,095,297  6/1963  Rembe..................71/1

OTHER PUBLICATIONS

Brintzinger et al. II, Z. fur Anorg. Chem. Vol. 254 (1947) p. 271–283
Pfeiffer et al. Berichte 75 (1942B) p. 1–12
Elovich et al. Chem. Abts. 56 (1961) column 15139
Brintzinger et al. I Z. fur Anorg. u. Allgem Chem. Vol. 249, p. 299–307
Kirson et al. Bull. Soc. Chem. France, 1961, p. 1081–1084

Primary Examiner—Tobias E. Levow
Assistant Examiner—A. P. Demers
Attorney—Herbert B. Roberts, Neal E. Willis and Robert M. Phipps

[57] ABSTRACT

Solid nitrilotriacetate (NTA) - metal complexes having a metal to NTA molar ratio of more than 1.5 to 1, the metal being copper or manganese, are useful as micronutrients for plants and as catalysts in oxidation reactions. The solid complexes are prepared by reaction of a slurry of the metal salts with NTA in the molar ratio of 1:2 followed by drying. A small amount of mineral acid is an effective stabilizer for the solid complexes.

6 Claims, No Drawings

SOLID NITRILOTRIACETATE-METAL COMPLEXES

BACKGROUND

1. Field of the Invention

This invention relates to solid complexes of nitrilotriacetate (hereinafter referred to as NTA) and a metal which is either copper or manganese having a metal to NTA molar ratio of more than 1.5 to 1 and which is useful as a micronutrient for plants and as a catalyst in chemical reaction.

2. Description of the Prior Art

It is a well-annotated observation that the addition of chelated metal to the soil is a valuable treatment for overcoming chlorosis in plants. Although soils commonly contain large amounts of one or more of the metals, they are often unavailable, i.e., the compounds incorporating these metals do not release them to the plant. It has been found that these metals may be supplied to plants in an available form as respective metal sulfate. When the metals are added in the form of sulfate or equivalent compound relatively large quantities must be added due to the poor efficiency of the plant utilizing metal from these compounds. It is also been found that plants can more efficiently obtain these metals from some metal amine chelating compounds, e.g., the zinc salt of ethylene diaminetetraacetic acid. Use of these expensive metal chelating compounds have been limited to those few instances where, because of peculiar conditions of plant physiology or soil conditions, the plant is incapable of absorbing the trace metal when present in its natural form, or the less expensive metal sulfate.

In an effort to avoid the drawbacks of the use of ethylene diaminetetraacetic acid (EDTA) U.S. Pat. No. 2,891,854 disclosed the use of iron chelates of diethylenetriaminepentaacetic acid (DTPA). This patent taught that in marked contrast to the iron-EDTA chelate, the iron-DTPA chelate is much more effective in alkaline soils and much less toxic to the treated plant. In an attempt to meet the objections of the prior art, U.S. Pat. No. 3,115,511 proposed the use of iron chelate compositions which is the reaction product of a mole of an amino acid and a mole of powdered iron. Another approach to the problem is offered by British Pat. No. 1,094,781 wherein a combination of the metal salt and metal aminoacetate is employed, e.g., manganese nitrilotriacetate and manganese sulfate in a ratio of 1:3.

The metal chelate or complex, because of its greater solubility in a number of solvents, its stability, and its definite metal content, is a convenient form of catalyst in many chemical reactions. More specifically, it is often used in reactions where oxidation is taking place such as oxidation, bleaching, and drying of unsaturated linseed oil.

SUMMARY OF THE INVENTION

It is an object of this invention to provide a composition which is more effective in supplying trace metal micro-nutrients to plants and to provide a composition useful as a catalyst. It is another object of this invention to provide a simple direct means of preparing process for preparing the composition of this invention. Other objects and advantages will become apparent upon inspection of this specification.

The invention sought to be patented, in its composition aspect, is described as residing in the concept of a plant micronutrient or a catalyst which is a chelate containing more than 1.5 moles of nitrilotriacetate and one mole of copper or manganese as the metal active ingredient.

The invention sought to be patented, in its process aspect, is described as residing in the concept of a reaction between nitrilotriacetate and a slurry of the metal salts, such as sulfate, chloride and nitrate. The products of this process are stabilized against oxidation by the admixing of small amounts of acid with the reactants.

DESCRIPTION OF THE PREFERRED EMBODIMENTS

The novel complexes of this invention are prepared by reacting a slurry of one mole of the metal salt with at least 1.5 moles and preferably 1.6 to 2.5 moles of nitrilotriacetate at a temperature from 0° to about 100°C and preferably from about 50° to 90°C. The time of the reaction will vary depending upon the temperature at which the reaction is carried out, time ranging from about 10 minutes for the manganese slurry at room temperature to about 3 minutes at 100°C.

The material to be reacted needs to be in a finely divided state, the finer the particle size the more complete the reaction in a shorter period of time. It is particularly desirable that 95 percent by weight of the reactants employed in the process of this invention pass through an U.S. sieve of 20 mesh.

The metal salt is preferred to be the easily commercial available form, such as sulfate, chloride, nitrate, carbonate, or oxide. The nitrilotriacetate is preferred as ammonium, sodium, potassium, or acid, or a mixture thereof.

For the process of this invention, water should be sparingly used. Thus, in the preparation of the manganese slurry an equal amount by weight of manganese monohydrate and water (preferably hot) is satisfactory. Lesser amounts of water, as low as 0.4 moles of water per mole of manganese, can be employed. In the preparation of the copper complex hot water or steam can be used to prepare a saturated copper sulfate solution at 100°C. This saturated solution represents the maximum amount of water to be used in the process of this invention.

It is also been found useful to add small amounts of mineral acid such as sulfuric acid, hydrochloric acid, or nitric acid as an oxidation stabilizer for the novel complexes of this invention. It is particularly advantageous to employ the sulfuric acid in the preparation of the manganese complex. When adding sulfuric acid, the amount of 98 percent acid may vary up to 5 pounds for every 100 pounds of manganese complex formed, generally about 3.5 pounds is satisfactory. When properly stabilized, a 10 percent solution of the manganese complex has a pH of 7 to 8.

The novel solid complexes of this invention are useful as a micronutrient plant food and are applied as any other plant food. They may be admixed with other solids and applied as a conventional solid fertilizer or put into aqueous solution and applied either separately or with other liquid plant foods with conventional applicators such as sprays.

The metal chelate or complex of this invention, because of its greater solubility in a number of solvents, its stability, and its definite metal content, is a convenient form of catalyst in many chemical reactions. More specifically, it is often used in reactions where oxidation is taking place such as oxidation, bleaching, and drying of unsaturated linseed oil. As an oxidation reaction catalyst, the complexes of this invention are usually used in amounts less than 1.0 percent based on active metal content. Typical use ranges from about 0.25 to 1,000 ppm, the actual amount for any given application being easily ascertained by routine experimentation following standard procedures by those acquainted with the art. For example, 0.25 to 5 ppm is advantageously used in textile bleaching.

The following examples are included to illustrate the preparation of the novel solid complexes of the present invention but are not to be considered limiting. Unless otherwise specified, all parts are by weight and all temperatures are degrees centigrade.

EXAMPLE 1

To a sigma-blade type blender having a rotor speed of 31.5 revolutions per minute was charged 37.9 parts of manganese sulfate monohydrate, 29.2 parts water and 103.1 parts of sodium nitrilotriacetate monohydrate. Also 3.5 parts of 98 percent sulfuric acid was charged. The reaction was completed in 10 minutes, the reaction temperature being about 80°C. The resulting product $Na_4Mn(N(CH_2CO_2)_3)_2$ yield was 100 parts. Water (35.9 parts) was removed and 31.8 parts of sodium sulfate as a by-product was obtained. The novel solid NTA-manganese complex product gives the following distinctive X-ray diffraction pattern (first fifteen lines):

$Na_4Mn(N(CH_2COO)_3)_2$

| d | 2θ* | I/I° |
|---|-----|------|
| 8.05 | 11.0 | 46 |
| 7.69 | 11.5 | 59 |
| 6.74 | 13.1 | 97 |
| 6.13 | 14.4 | 20 |
| 5.67 | 15.6 | 12 |
| 5.21 | 17.0 | 28 |
| 5.18 | 17.1 | 24 |
| 5.03 | 17.6 | 38 |
| 4.48 | 19.8 | 18 |
| 4.06 | 21.9 | 38 |
| 3.96 | 22.5 | 22 |
| 3.67 | 24.2 | 40 |
| 3.43 | 25.9 | 17 |
| 3.41 | 26.1 | 17 |
| 3.36 | 26.5 | 22 |

*With Cu αradiation

EXAMPLE 2

Using the procedure of Example 1, 42.6 parts of copper sulfate pentahydrate, and 22 parts of water as a saturated solution plus 94 parts of sodium nitrilotriacetate monohydrate were charged to the reactor. 100 parts of $Na_4Cu(N(CH_2COO)_3)_2 \cdot 3H_2O$ solid complex was obtained. A sodium sulfate by-product of 24.25 parts was obtained while 34.3 parts of water were removed. The solid complex product had an X-ray diffraction pattern (first sixteen lines) as follows:

$Na_4Cu(N(CH_2COO)_3)_2 \cdot 3H_2O$

| d | 2θ* | I/I° |
|---|-----|------|
| 9.09 | 9.7 | 98 |
| 7.21 | 12.3 | 29 |
| 7.06 | 12.5 | 20 |
| 6.98 | 13.7 | 20 |
| 6.60 | 13.4 | 61 |
| 5.75 | 15.4 | 45 |
| 5.01 | 17.7 | 13 |
| 4.88 | 18.2 | 34 |
| 4.79 | 18.5 | 41 |
| 4.67 | 19.0 | 36 (est.) |
| 4.49 | 19.7 | 78 |
| 4.44 | 20.0 | 27 |
| 4.00 | 22.2 | 60 |
| 3.89 | 22.8 | 22 |
| 3.71 | 24.0 | 7 |
| 3.54 | 25.1 | 100 |

*with Cu Kαradiation

EXAMPLE 3

The manganese complex of Example 1 was applied to various test plots of Pangola grass grown in a sandy loam found near Guatiles, Costa Rica to which various amount of lime was also added. The manganese complex successfully increased the amount of manganese uptake by the grass. The following manganese values were obtained.

| Lime Metric Tons/Hectare | Amount of Complex Applied Mn levels as kg of Mn/Hectare | | | Avg. Soil ph |
|---|---|---|---|---|
| | 0 | 60 | 120 | |
| | ppm Mn in Pangola grass | | | |
| 0 | 460 | 700 | 767 | 5.39 |
| 5 | 133 | 153 | 177 | 5.99 |
| 10 | 63 | 67 | 47 | 6.46 |

EXAMPLE 4

Manganese was applied on at the rate of 15 ppm (on a soil basis) to a high pH soil (about 8) which was predominately lime rock and grew Pangola grass. After one cutting the untreated control showed 15 ppm manganese in the leaves. Grass treated with manganese sulfate showed 20 ppm manganese. Grass treated with the manganese complex of Example 1 showed 25 ppm manganese which shows the greater utilization of micronutrients when supplied as the solid complex of this invention.

Similar advantageous results are obtained by the use of the copper complex of this invention.

EXAMPLE 5

Replicate unbleached cotton swatches (12.7 cm on each side) were bleached in hard water (hardness 150 ppm) at 49°C with 22.6 ppm active oxygen for 10 minutes in the presence of 0.15 percent by weight of a commercial laundry detergent based on anionic surfactants and sodium tripolyphosphate builder in a laboratory type miniature version of an agitator type washing machine. Color difference meter measurements were made on the swatches before and after bleaching. The improvement of using 0.5 ppm of the copper complex of Example 2 in the bleach bath was 53 percent over sodium NTA at 1 ppm and 22 percent over a complex of copper and sodium NTA in a 1:1 molar ratio at 0.5 ppm. Similar improvements were obtained using the manganese complex of Example 1 over sodium NTA or 1:1 molar ratio complex of manganese and sodium NTA.

The foregoing examples and method have been described in the foregoing specification for the purpose of illustration and not limitation. Many other modifications and ramifications will naturally suggest themselves to those skilled in the art based on this disclosure. These are intended to be comprehended as within the scope of this invention.

Having thus described our invention, what we desire to claim and secure by Letters Patent is:

1. Solid complexes of a potassium sodium or ammonium nitrilotriacetate and manganese wherein the molar ratio of nitrilotriacetate to manganese is from 1.5:1 to 2:1.

2. The solid complex of claim 1 wherein a 10 percent by weight solution of said complex has a pH of from about 7 to about 8.

3. A method of preparing solid complexes of nitrilotriacetate and metal having a molar ratio of from 1.5:1 to 2:1 by reacting an admixture of a slurry of manganese or copper salts with a particulate ammonium, sodium or potassium nitrilotriacetate in a molar ratio of at least 1:1.5 at a temperature of about 0° to 100°C said metal salt and said nitrilotriacetate having a particle size such that 95 percent by weight pass through a U.S. Standard Sieve of 20 mesh.

4. The process of claim 3 wherein the metal salt is a sulfate and the nitrilotriacetate is sodium nitrilotriacetate.

5. The method of claim 3 wherein the reaction is carried out in the presence of a stabilizing amount of a mineral acid and wherein said metal salt is manganese sulfate.

6. The method of claim 5 wherein the mineral acid is sulfuric acid.

* * * * *

UNITED STATES PATENT OFFICE
CERTIFICATE OF CORRECTION

PO-1050
(5/69)

Patent No. 3,687,992     Dated August 29, 1972

Inventor(s) William A. Feiler

It is certified that error appears in the above-identified patent and that said Letters Patent are hereby corrected as shown below:

In column 3, line 31, the formula reading "$Na_4Mn(N(Ch_2CO_2)_3)_2$" should read ---$Na_4Mn(N(CH_2CO_2)_3)_2$---.

In column 3, line 51, line reading "*With Cu α radiation" should read ---*With Cu Kα radiation---.

In column 3, line 58, end of formula reading "·3H2O" should read ---·$3H_2O$---.

In column 4, line 24, formula reading "ph" should read ---pH--- and should be placed under title "Avg. Soil".

Signed and sealed this 23rd day of January 1973.

(SEAL)
Attest:

EDWARD M. FLETCHER, JR.
Attesting Officer

ROBERT GOTTSCHALK
Commissioner of Patents